(12) United States Patent
Rion et al.

(10) Patent No.: US 11,841,552 B1
(45) Date of Patent: Dec. 12, 2023

(54) EYEWEAR AND RELATED METHOD

(71) Applicants: Kimberly Ann Rion, Bay Village, OH (US); Christian Kloepfer, Bay Village, OH (US)

(72) Inventors: Kimberly Ann Rion, Bay Village, OH (US); Christian Kloepfer, Bay Village, OH (US)

( * ) Notice: Subject to any disclaimer, the term of this patent is extended or adjusted under 35 U.S.C. 154(b) by 0 days.

(21) Appl. No.: 18/122,679

(22) Filed: Mar. 16, 2023

(51) Int. Cl.
*G02C 11/00* (2006.01)

(52) U.S. Cl.
CPC .......... *G02C 11/00* (2013.01); *G02C 2200/02* (2013.01)

(58) Field of Classification Search
CPC ...... G02C 11/00; G02C 2200/02; G02C 5/14; G02C 5/143
USPC .................................................. 351/111, 112
See application file for complete search history.

(56) References Cited

U.S. PATENT DOCUMENTS

| | | | | |
|---|---|---|---|---|
| 8,219,462 B1* | 7/2012 | Keeney | ............ | G06Q 30/0643 705/26.1 |
| 8,919,951 B2* | 12/2014 | Steele | ...................... | G02C 7/14 351/158 |
| 10,634,931 B1* | 4/2020 | Zargari | ................. | G02C 5/143 |
| 2008/0088791 A1* | 4/2008 | Smith | ..................... | G02C 9/00 351/57 |
| 2009/0079930 A1* | 3/2009 | Lipawsky | ............... | G02C 9/04 351/57 |
| 2009/0279046 A1* | 11/2009 | Dreher | ..................... | G02C 9/00 351/57 |
| 2011/0024585 A1* | 2/2011 | Brinkdopke | .......... | A47K 10/32 248/217.4 |
| 2014/0226121 A1* | 8/2014 | Schmidt | ................. | G02C 1/06 351/140 |
| 2018/0074342 A1* | 3/2018 | Boedecker | ............ | G02C 5/006 |
| 2018/0095298 A1* | 4/2018 | Tang | ..................... | H04R 1/105 |
| 2018/0129067 A1* | 5/2018 | Boedecker | ............ | G02C 5/008 |
| 2018/0335641 A1* | 11/2018 | Ernica | ..................... | G02C 5/146 |
| 2018/0335643 A1* | 11/2018 | Kozak | .................... | G02C 5/143 |
| 2019/0179173 A1* | 6/2019 | Blum | ..................... | G02C 11/00 |
| 2020/0041822 A1* | 2/2020 | Blum | ..................... | G02C 5/146 |
| 2023/0010221 A1* | 1/2023 | Lee | ........................ | G02B 7/08 |
| 2023/0044904 A1* | 2/2023 | Walker | .................. | G02C 5/146 |

* cited by examiner

*Primary Examiner* — William R Alexander
(74) *Attorney, Agent, or Firm* — Curatolo Sidoti & Trillis Co., LPA; Salvatore A. Sidoti; Floyd Trillis, III

(57) ABSTRACT

Eyewear includes at least one ferromagnetic member, region, surface or material for releasably mounting the eyewear to a target surface with a magnet. Kits and methods for mounting a pair of eyewear including at least one ferromagnetic member, region, surface or material with a magnet.

26 Claims, 6 Drawing Sheets

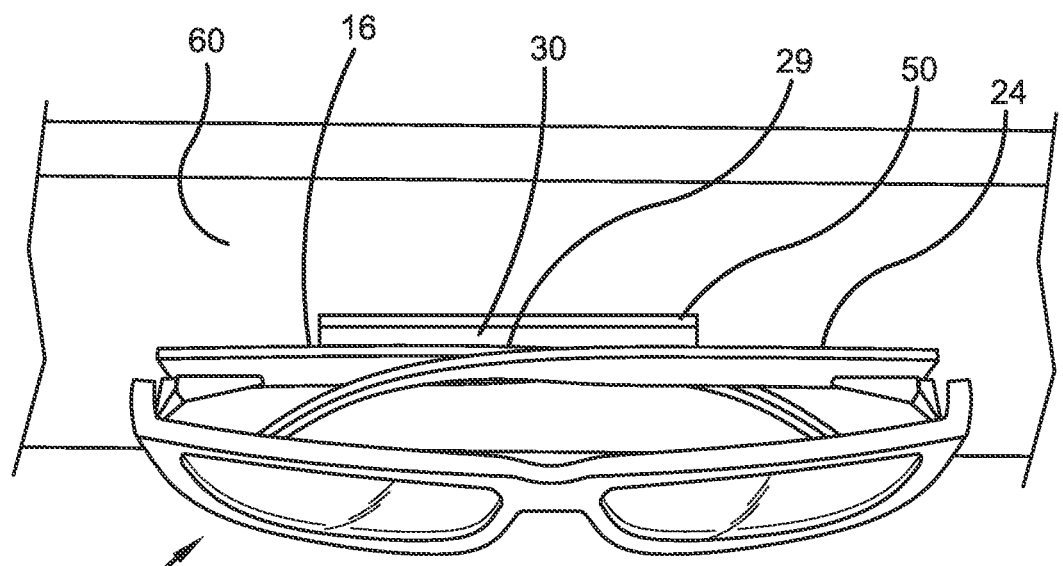
FIG. 8A
FIG. 8B
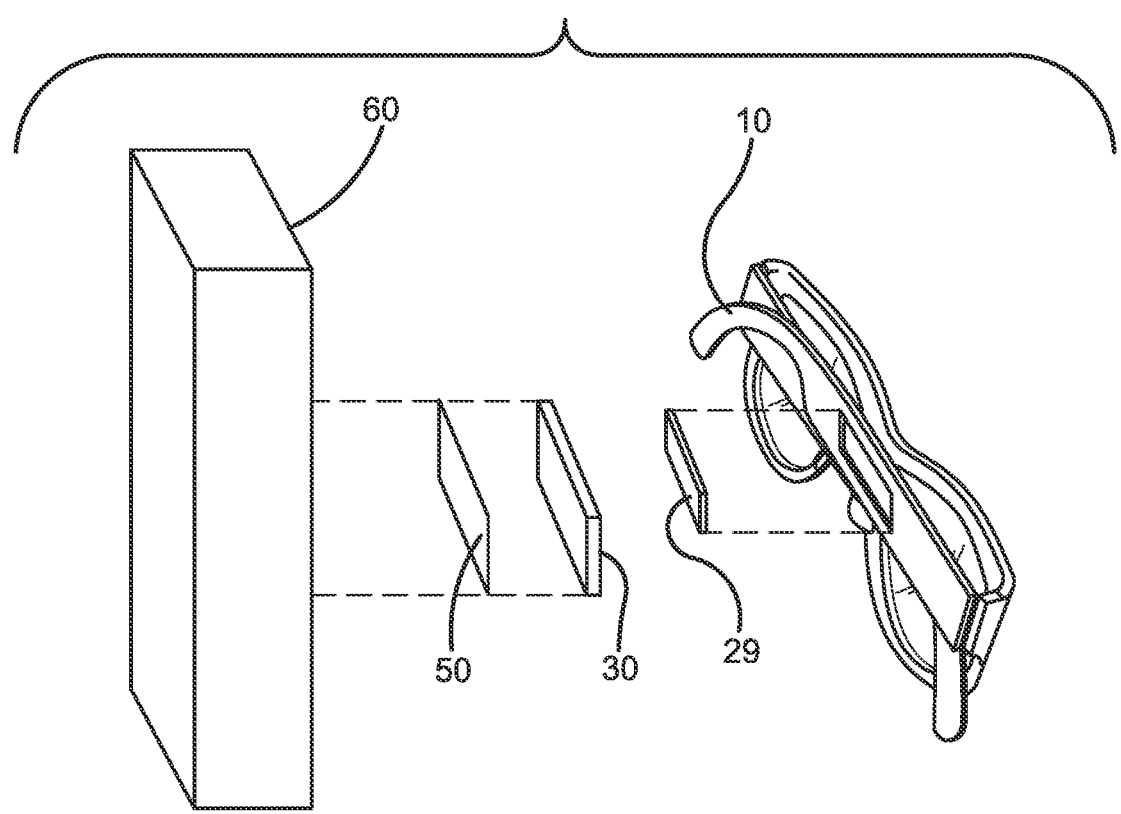

EYEWEAR AND RELATED METHOD

TECHNICAL FIELD

The present disclosure relates to eyewear, kits including the eyewear, and methods of mounting the eyewear to a surface.

BACKGROUND

It is estimated that over 4 billion people in the world wear corrective eyewear. In addition to the corrective eyewear, sunglasses are worn to avoid negative eye health conditions caused by ultraviolet light from the sun, to enjoy the outdoors, for fashion reasons, and to promote safer driving of vehicles. Safety glasses are also worn or required to be worn in a wide variety of commercial, industrial and home settings to protect the eyes from damages and injury.

Corrective eyewear, sunglasses, and safety glasses are expensive items which must be replaced if damaged or lost. Most people prefer not to have their eyewear hanging around their neck or attached to the front of their clothing. Many people misplace their eyewear because they do not have a designated location to safely store their eyewear when not in use. Additionally, eyewear may be damaged or irreparably broken if inadvertently left in an inconvenient location.

What is needed in the art is a system and method for a releasably mounting a pair of eyewear in a safe and convenient location where they can be easily found for future use.

SUMMARY OF ILLUSTRATIVE EMBODIMENTS

According to a first illustrative embodiment, disclosed is eyewear comprising first and second temples and a ferromagnetic member, region, or surface on at least one of said first or second temples.

According to a second illustrative embodiments, disclosed is eyewear comprising a frame, at least one lens carried by said frame, first and second temples hingedly attached to said frame, and a ferromagnetic member, region, or surface on at least one of said first or second temples.

According to a third illustrative embodiment, disclosed is eyewear comprising a frame, at least one lens carried by said frame, first and second temples hingedly attached to said frame, wherein least one of said first or second temples comprises a ferromagnetic member, region.

According to a fourth illustrative embodiment, disclosed is a kit comprising eyewear comprising at least one pair of eyewear comprising first and second temples and a ferromagnetic member, region, or surface on at least one of said first or second temples, and at least one magnet.

According to a fifth illustrative embodiment, disclosed is a kit comprising at least one pair of eyewear comprising a frame, at least one lens carried by said frame, first and second temples hingedly attached to said frame, and a ferromagnetic member, region, or surface on at least one of said first or second temples, and at least one magnet.

According to a sixth illustrative embodiment, disclosed is a kit comprising at least one pair of eyewear comprising a frame, at least one lens carried by said frame, first and second temples hingedly attached to said frame, wherein least one of said first or second temples comprises a ferromagnetic member and at least one magnet.

According to a seventh illustrative embodiment, disclosed is a method of storing eyewear comprising attaching a magnet to a target surface, providing eyewear comprising at least one pair of eyewear comprising first and second temples and a ferromagnetic member, region, or surface on at least one of said first or second temples, and at least one magnet, and engaging said ferromagnetic surface of said eyewear with said magnet.

According to an eighth illustrative embodiment, disclosed is a method of storing eyewear comprising attaching a magnet to a target surface, providing at least one pair of eyewear comprising a frame, at least one lens carried by said frame, first and second temples hingedly attached to said frame, and a ferromagnetic member, region, or surface on at least one of said first or second temples, and engaging said ferromagnetic surface of said eyewear with said magnet.

According to a nineth illustrative embodiment, disclosed is a method of storing eyewear comprising attaching a magnet to a target surface, providing at least one pair of eyewear comprising a frame, at least one lens carried by said frame, first and second temples hingedly attached to said frame, wherein least one of said first or second temples comprises a ferromagnetic member and engaging said ferromagnetic surface of said eyewear with said magnet.

The Summary of Illustrative Embodiments section of the present Specification is intended as a brief introduction to certain illustrative embodiments of the disclosure and should not be considered to limit the scope of the appended claims in any manner whatsoever.

BRIEF DESCRIPTION OF DRAWINGS

The presently described illustrative embodiments can be more fully understood when the present disclosure is read in view of the accompanying drawing figures in which:

FIG. 8A is a top perspective view showing a pair of eyewear magnetically engaged with a magnet which is attached to a vertical surface.

FIG. 8B is an exploded side view showing a pair of eyewear magnetically engaged with a magnet which is attached to a vertical surface.

DETAILED DESCRIPTION OF ILLUSTRATIVE EMBODIMENTS

Figure 1:
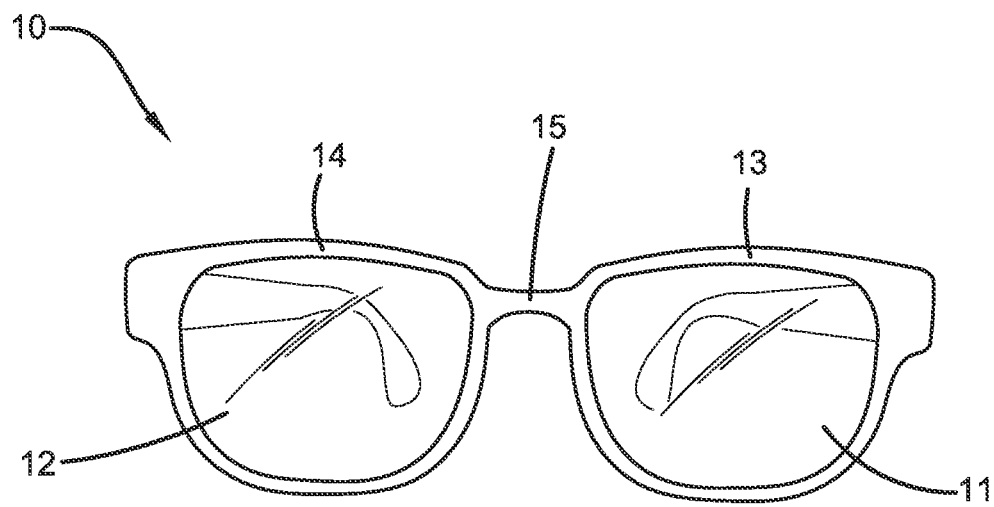
FIG. 1 front view of an illustrative embodiment of the eyewear of the present disclosure.
Figure 2:
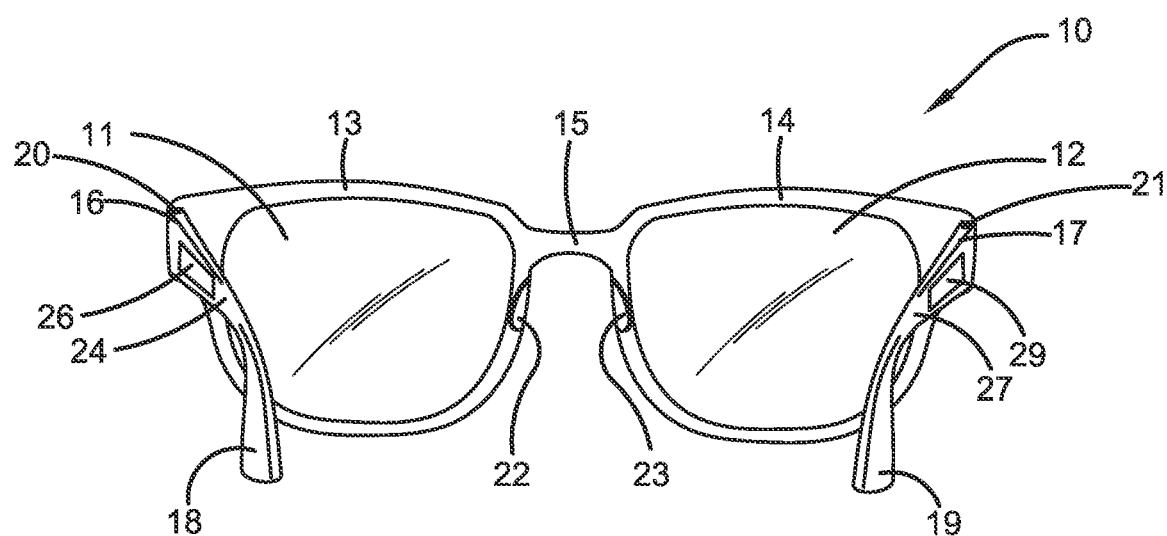
FIG. 2 is a rear view of the illustrative embodiment of the eyewear shown in FIG. 1.

The following text sets forth a broad description of numerous different and illustrative embodiments of the present disclosure. The description is to be construed as exemplary only and does not describe every possible embodiment since describing every possible embodiment would be impractical, if not impossible. It will be understood that any feature, characteristic, component, composition, ingredient, product, step, or methodology described herein can be deleted, combined with or substituted for, in whole or part, any other feature, characteristic, component, composition, ingredient, product, step, or methodology described herein. Numerous alternative embodiments could be implemented, using either current technology or technology developed after the filing date of this patent, which would still fall within the scope of the claims.

The terms "comprises," "comprising," "has," "having," "includes," "including," "contains," "containing," or any other variation are open-ended and are intended to cover a non-exclusive inclusion of elements, such that an article, apparatus, combination, method, or process that "comprises," "has," or "includes," or "contains" a recited list of elements does not include only those elements but may include other elements not expressly listed, recited or written in the specification or claims. An element or feature proceeded by the language "comprises . . . a," "contains . . . a," "has . . . a," or "includes . . . a" does not, without more constraints, preclude the existence or inclusion of additional elements or features in the article, apparatus, combination, method, or process that comprises, contains, has, or includes the element or feature.

The terms "a" and "an" are defined as one or more than one unless expressly stated otherwise or constrained by other language herein. An element or feature proceeded by "a" or "an" may be interpreted as one of the recited element or feature, or more than one of the element or feature.

The terms "about," "approximately," "essentially," "substantially," any other version thereof, or any other similar relative term, or similar term of approximation, are defined as being close to as understood by one having ordinary skill in the art. By way of non-limiting, illustrative embodiments, these terms are defined to be within 20% of a recited value, or defined to be within 10% of a recited value, or defined to be within 5% of a recited value, or defined to be within 4% of a recited value, or defined to be within 3% of a recited value, or defined to be within 2% of a recited value, or defined to be within 1% of a recited value, or defined to be within 0.5% of a recited value, or defined to be within 0.25% of a recited value, or defined to be within 0.1% of a recited value.

For the avoidance of doubt, preferences, options, particular features and the like indicated for a given aspect, feature or parameter of the invention should, unless the context indicates otherwise, be regarded as having been disclosed in combination with any and all other preferences, options, particular features and the like as indicated for the same or other aspects, features and parameters of the embodiments of the present disclosure.

Disclosed is eyewear including a ferromagnetic member, region, or surface for mounting the eyewear to a desired surface with a magnet. The eyewear, kit, system and method are broadly applicable to all types of wearable eyewear including, for example, corrective eyeglass or eyewear, reading glasses or reading eyewear, sunglass (prescription or otherwise), safety glass (prescription or otherwise), and the like. By incorporating a ferromagnetic material in the eyewear, such as a ferromagnetic member, region, or surface, a magnetizable member, region, or surface is created that can attach to a stationary magnet. The eyewear, system, and method solve the problem of misplacing eyewear without having to have the eyewear physically attached to your body. According to certain illustrative embodiments, the eyewear comprises first and second temples and a ferromagnetic member, region, or surface on at least one of the first or second temples. According to certain illustrative embodiments, the eyewear consists essentially of the first and second temples and the ferromagnetic member, region, or surface on at least one of the first or second temples. According to certain illustrative embodiments, the eyewear consists of the first and second temples and the ferromagnetic member, region, or surface on at least one of the first or second temples.

According to certain illustrative embodiments, the eyewear comprises a frame, at least one lens carried by the frame, first and second temples hingedly attached to the frame and a ferromagnetic member, region, or surface on at least one of the first or second temples. According to certain illustrative embodiments, the eyewear consists essentially of a frame, at least one lens carried by the frame, first and second temples hingedly attached to the frame, and a ferromagnetic member, region, or surface on at least one of the first or second temples. According to certain illustrative embodiments, the eyewear consisting of a frame, at least one lens carried by the frame, first and second temples hingedly attached to the frame, and a ferromagnetic member, region, or surface on at least one of the first or second temples.

According to certain illustrative embodiments, the eyewear comprises a frame, at least one lens carried by the frame, first and second temples hingedly attached to said frame, wherein least one of the first or second temples comprises a ferromagnetic member, region, or surface. According to certain illustrative embodiments, the eyewear consists essentially of a frame, at least one lens carried by the frame, first and second temples hingedly attached to the frame, wherein least one of the first or second temples comprises a ferromagnetic member, region, or surface. According to certain illustrative embodiments, the eyewear consists of a frame, at least one lens carried by the frame, first and second temples hingedly attached to the frame, wherein least one of the first or second temples comprises a ferromagnetic member, region, or surface.

According to certain embodiments, the ferromagnetic member, region, or surface is positioned on one or more of the surfaces of the temples of the eyewear that face outwardly from the midline of the eyewear. According to other embodiments, the ferromagnetic member, region, or surface may be located or positioned within a recess formed in the first and/or second temples of the eyewear. For example, the temples of the eyewear may be formed with at least one recess in the first surfaces of the first and second temples and the ferromagnetic member is embedded or inlaid within the at least one recess of one of the first and second temples of the eyewear. The ferromagnetic member maybe friction fitted into the recess to hold it in place. According to other embodiments, the ferromagnetic member may be secured within the recess of one of the first and second temples of the eyewear by adhesives or mechanical fasteners. According to certain embodiments, when the ferromagnetic member is inlaid into a recess formed in the outwardly facing surface of one or more temples of the eyewear, the outwardly facing surface of the ferromagnetic member and the outwardly facing surface of the one or more temples of the eyewear are flush. The location or positioning of the ferromagnetic material, such as the ferromagnetic member, region, or surface, may be changed from the temples of the eyewear to other locations such as the rims or bridge of the frame of the pair of eyewear. According to certain embodiments, a ferromagnetic material may be located on one or more of the temples of the eyewear and in one or more other locations on the frame of the eyewear.

According to certain illustrative embodiments, the geometric shape of the ferromagnetic member is a rectangle. This is only one illustrative geometric shape and the ferromagnetic member may be provided in any other geometric shape so long as the dimensions and shape are suitable for mounting the eyewear to the target surface with a magnet. The recess formed in the temples of the eyewear are formed in the same shape to accept the ferromagnetic member.

For any of the embodiments of the eyewear disclosed in the present specification, no component or part of the eyewear carriers or otherwise includes or constitutes a magnet. For any of the embodiments of the eyewear disclosed in the present specification, no component or part of the eyewear carries or otherwise includes or constitutes a material that can itself generate a magnetic field. For avoidance doubt, for any of the embodiments of the eyewear disclosed in the present specification, neither of the temples of the eyewear carry or include or constitute a magnet. According to certain illustrative embodiments, the eyewear comprises first and second temples and a ferromagnetic member, region, or surface on at least one of the first or second temples and does not carry or include a magnet. According to certain illustrative embodiments, the eyewear comprises a frame, at least one lens carried by the frame, first and second temples hingedly attached to the frame, and a ferromagnetic member, region, or surface on at least one of the first or second temples and does not carry or include a magnet. According to certain illustrative embodiments, the eyewear comprises a frame, at least one lens carried by the frame, first and second temples hingedly attached to said frame, wherein least one of the first or second temples comprises a ferromagnetic member, region, or surface, and the temples do not carry or include a magnet. According to all embodiments disclosed in this specification, the frame of the eyewear and the first and second temples may comprise a plastic material. According to all embodiments disclosed in this specification, the frame comprises a plastic material and the first and said second temples comprise a ferromagnetic material.

Also disclosed is a kit comprising at least one pair of eyewear, a magnet, and means to attach the magnet to a target surface. According to certain embodiments, the eyewear of the kit comprises at least one pair of eyewear comprising first and second temples and a ferromagnetic member, region, or surface on at least one of said first or second temples, and at least one magnet. According to certain illustrative embodiments, the eyewear of the kit consists essentially of at least one pair of eyewear comprising first and second temples and a ferromagnetic member, region, or surface on at least one of said first or second temples, and at least one magnet. According to certain illustrative embodiments, the eyewear of the consists of at least one pair of eyewear comprising first and second temples and a ferromagnetic member, region, or surface on at least one of said first or second temples, and at least one magnet.

According to certain illustrative embodiments, the kit comprises at least one pair of eyewear comprising a frame, at least one lens carried by said frame, first and second temples hingedly attached to said frame, and a ferromagnetic member, region, or surface on at least one of said first or second temples, and at least one magnet. According to certain illustrative embodiments, the kit comprises at least one pair of eyewear consisting essentially of a frame, at least one lens carried by said frame, first and second temples hingedly attached to said frame, and a ferromagnetic member, region, or surface on at least one of said first or second temples, and at least one magnet. According to certain illustrative embodiments, the kit comprises at least one pair of eyewear consists of a frame, at least one lens carried by said frame, first and second temples hingedly attached to said frame, and a ferromagnetic member, region, or surface on at least one of said first or second temples, and at least one magnet.

According to certain illustrative embodiments, the kit comprises at least one pair of eyewear comprising a frame, at least one lens carried by said frame, first and second temples hingedly attached to said frame, wherein least one of said first or second temples comprises a ferromagnetic member, region, or surface, and at least one magnet. According to certain illustrative embodiments, the kit comprises at least one pair of eyewear consisting essentially of a frame, at least one lens carried by said frame, first and second temples hingedly attached to said frame, wherein least one of said first or second temples comprises a ferromagnetic member, region, or surface, and at least one magnet. According to certain illustrative embodiments, the kit comprises at least one pair of eyewear consisting of a frame, at least one lens carried by said frame, first and second temples hingedly attached to said frame, wherein least one of said first or second temples comprises a ferromagnetic member, region, or surface, and at least one magnet.

The ferromagnetic material of the eyewear comprises any material that is capable of being magnetized. The ferromagnetic material may be selected from ferromagnetic metals and ferromagnetic metal alloys. Without limitation, any only by way of illustration, the ferromagnetic metals are selected from the group consisting of cobalt, iron and nickel. The ferromagnetic metal alloys may be selected from cobalt alloys, iron alloys, nickel alloys and alloys of rare-earth metals.

The least one magnet of the kit is selected a material capable of producing a magnetic field and exerting pulling force on a ferromagnetic material. By way of illustration, and not in limitation, the magnet of the combination, kit, system, and method comprises a neodymium magnet.

According to certain embodiments, the means for attaching the magnet to the target surface includes adhesives, nails, pins, rivets, rods and tacks. The kit includes an adhesive for adhesively bonding the magnet to a surface. According to certain embodiments, the adhesive comprises a pressure sensitive adhesive. Without limitation, the adhesive is selected from the group consisting of liquid adhesives, paste adhesives, and double-sided adhesive tapes. According to certain embodiments, the adhesive is provided on tape. The adhesive tape may be selected from double-sided film tapes and double-sided foam tapes. According to certain embodiments, the adhesive tape comprises a double-sided foam tape. The kit further includes instructions for mounting the eyewear to a target surface with the at least one magnet.

For any of the embodiments of the eyewear disclosed in the present specification that are included in the combination or kit, no component or part of the eyewear carries or otherwise includes or constitutes a magnet. For any of the embodiments of the eyewear disclosed in the present specification, no component or part of the eyewear carries or otherwise includes or constitutes a material that can itself generate a magnetic field. For avoidance doubt, for any of the embodiments of the eyewear disclosed in the present specification that are included in the combination or kit, neither of the temples of the eyewear carry or include or constitute a magnet.

Further disclosed is a method of storing eyewear. The method comprises attaching a magnet to a target surface, providing eyewear comprising at least one pair of eyewear comprising first and second temples and a ferromagnetic member, region, or surface on at least one of the first or second temples, and at least one magnet, and engaging the ferromagnetic surface of the eyewear with the magnet. According to certain illustrative embodiments, the method comprises attaching a magnet to a target surface, providing eyewear consisting essentially of at least one pair of eyewear comprising first and second temples and a ferromagnetic member, region, or surface on at least one of the first or second temples, and at least one magnet, and engaging the ferromagnetic surface of the eyewear with the magnet. According to certain illustrative embodiments, the method comprises attaching a magnet to a target surface, providing eyewear consisting of at least one pair of eyewear comprising first and second temples and a ferromagnetic member, region, or surface on at least one of the first or second temples, and at least one magnet, and engaging the ferromagnetic surface of the eyewear with the magnet.

According to certain illustrative embodiments, the method of storing eyewear comprises attaching a magnet to a target surface, providing at least one pair of eyewear comprising a frame, at least one lens carried by the frame, first and second temples hingedly attached to the frame, and a ferromagnetic member, region, or surface on at least one of the first or second temples, and engaging the ferromagnetic surface of the eyewear with the magnet. According to certain illustrative embodiments, the method of storing eyewear comprises attaching a magnet to a target surface, providing at least one pair of eyewear consisting essentially of a frame, at least one lens carried by the frame, first and second temples hingedly attached to the frame, and a ferromagnetic member, region, or surface on at least one of the first or second temples, and engaging the ferromagnetic surface of the eyewear with the magnet. According to certain illustrative embodiments, the method of storing eyewear comprises attaching a magnet to a target surface, providing at least one pair of eyewear consisting of a frame, at least one lens carried by the frame, first and second temples hingedly attached to the frame, and a ferromagnetic member, region, or surface on at least one of the first or second temples, and engaging the ferromagnetic surface of the eyewear with the magnet.

According to certain illustrative embodiments, the method of storing eyewear comprising attaching a magnet to a target surface, providing at least one pair of eyewear comprising a frame, at least one lens carried by the frame, first and second temples hingedly attached to the frame, wherein least one of the first or second temples comprises a ferromagnetic member, region, or surface, and engaging the ferromagnetic surface of the eyewear with the magnet. According to certain illustrative embodiments, the method of storing eyewear comprising attaching a magnet to a target surface, providing at least one pair of eyewear consisting essentially of a frame, at least one lens carried by the frame, first and second temples hingedly attached to the frame, wherein least one of the first or second temples comprises a ferromagnetic member, region, or surface, and engaging the ferromagnetic surface of the eyewear with the magnet. According to certain illustrative embodiments, the method of storing eyewear comprising attaching a magnet to a target surface, providing at least one pair of eyewear consisting of a frame, at least one lens carried by the frame, first and second temples hingedly attached to the frame, wherein least one of the first or second temples comprises a ferromagnetic member, region, or surface, and engaging the ferromagnetic surface of the eyewear with the magnet.

For any of the embodiments of the methods for mounting or storing the eyewear disclosed in the present specification, no component or part of the eyewear carries or otherwise includes or constitutes a magnet. For any of the embodiments of the eyewear disclosed in the present specification, no component or part of the eyewear carriers or otherwise includes or constitutes a material that can itself generate a magnetic field. For any of the embodiments of the methods for mounting or storing the eyewear disclosed in the present specification, neither of the temples of the eyewear carry or include a magnet.

As shown in FIGS. 1, 2, 5 and 6, illustrative embodiment of eyewear 10 includes lenses 11, 12 carried by a frame comprising rims 13, 14. Bridge 15 connections rims 13, 14 that carry lenses 11, 12. Temple 16 is hingedly connected to rim 13 with hinge 20. Temple 17 is hingedly connected to rim 14 with hinge 21. Temple 16 is elongated and terminates into temple tip 18. Temple 17 is elongated and terminates into temple tip 19. Rim 13 includes integral nose pad 22. Rim 14 includes integral nose pad 23.

Figure 3:
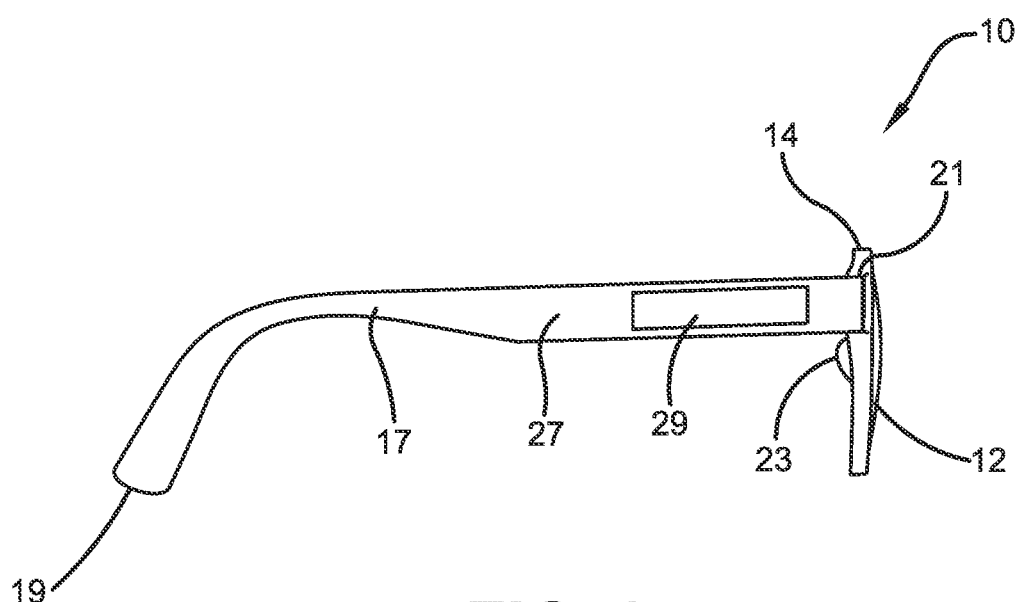
FIG. 3 is a right side view of the illustrative embodiment of the eyewear shown in FIG. 1.
Figure 4:
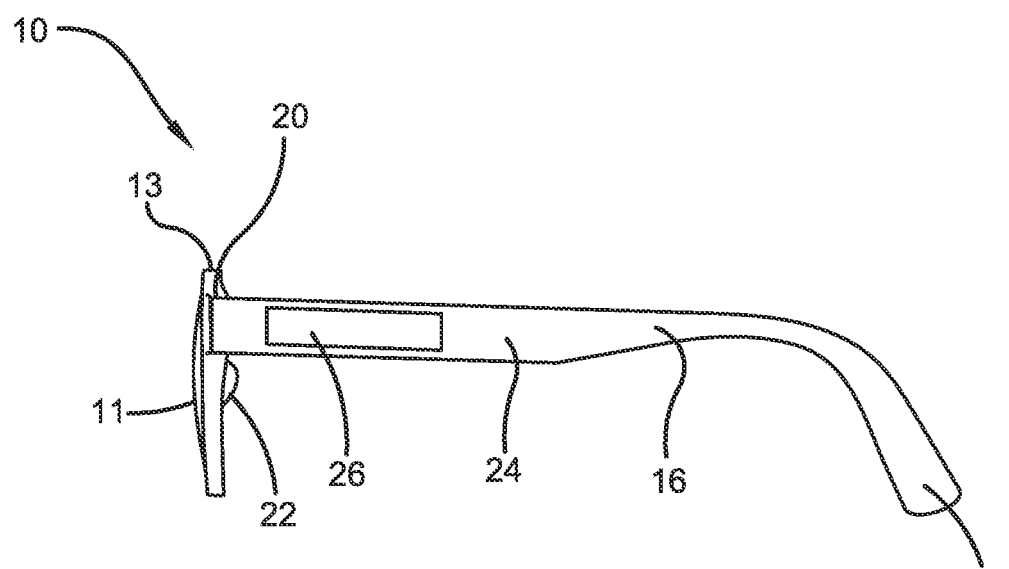
FIG. 4 is a left side view of the illustrative embodiment of the eyewear shown in FIG. 1.
Figure 7:
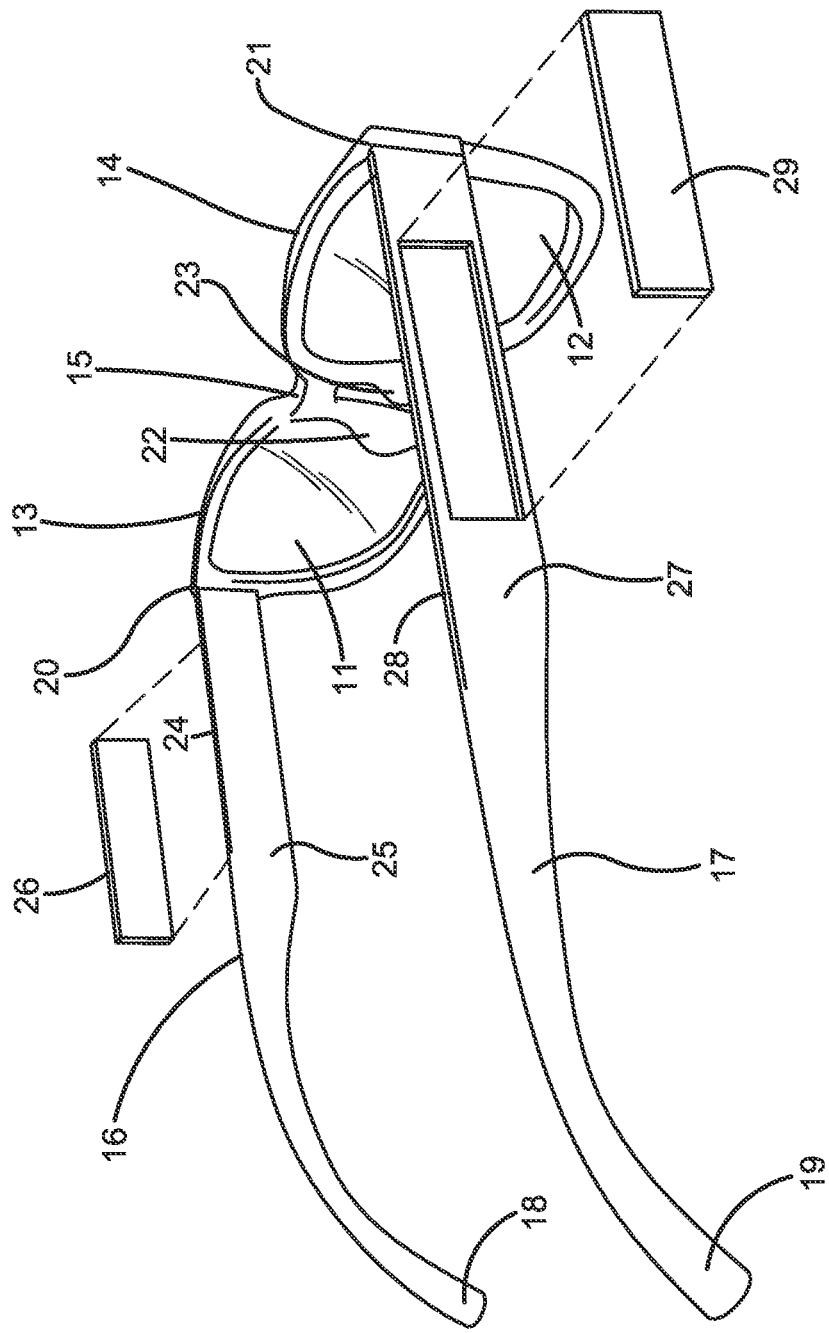
FIG. 7 is a top right perspective view of the illustrative embodiment of the eyewear shown in FIG. 1.

As shown in FIGS. 3, 4 and 7, illustrative embodiment of eyewear 10 includes lenses 11, 12 carried by a frame comprising rims 13, 14. Bridge 15 connections rims 13, 14 that carry lenses 11, 12. Temple 16 is hingedly connected to rim 13 with hinge 20. Temple 17 is hingedly connected to rim 14 with hinge 21. Temple 16 is elongated and terminates into temple tip 18. Temple 17 is elongated and terminates into temple tip 19. Rim 13 includes integral nose pad 22. Rim 14 includes integral nose pad 23. Temple 16 includes first 24 and second 25 surfaces. Ferromagnetic member, region, or surface 26 is engaged with first surface 24 of temple 16 of eyewear 10. Temple 17 includes first 27 and second 28 surfaces. Ferromagnetic member, region, or surface 29 is engaged with first surface 27 of temple 17 of eyewear 10. First ferromagnetic member, region, or surface 26 is positioned within a recess formed in the first surface 24 of temple 16. Second ferromagnetic member, region, or surface 29 is positioned within a recess formed in the first surface 27 of temple 17.

Figure 5:
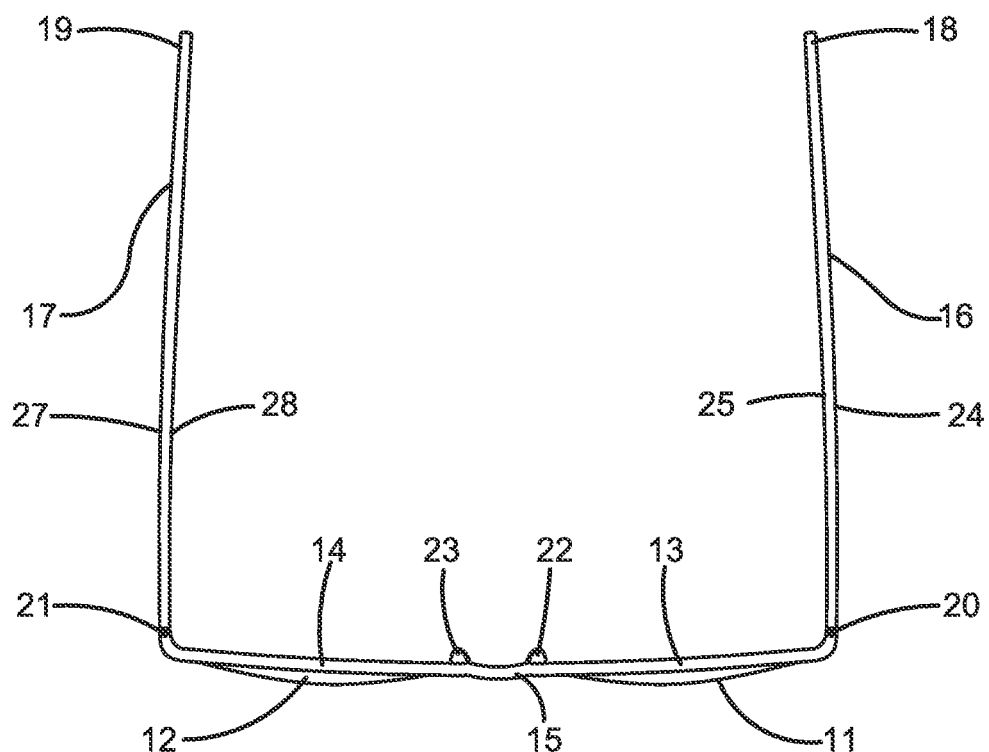
FIG. 5 is a font top plan view of the illustrative embodiment of the eyewear shown in FIG. 1.
Figure 6:
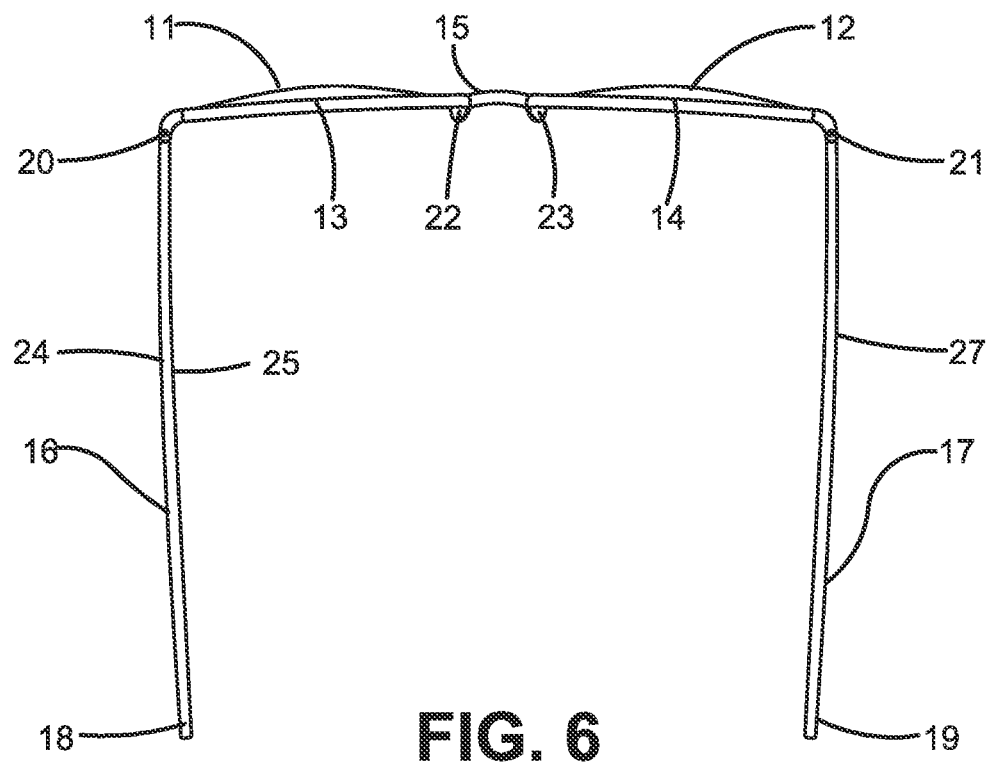
FIG. 6 is a rear top plan view of the illustrative embodiment of the eyewear shown in FIG. 1.

As shown in FIG. 5 temple 15 includes opposite facing first 23 and second 24 surfaces. First surface 23 of temple 15 includes a ferromagnetic region 25 on its surface. As shown in FIG. 6 temple 16 includes opposite facing first 26 and second 27 surfaces. First surface 26 of temple 27 includes a ferromagnetic region 28 on its surface.

FIGS. 8A and 8B show eyewear 10 mounted on a target surface. Magnet 30 is adhesively mounted onto a vertical target surface 60 with a strip of double-sided adhesive foam tape 50. Eyewear 10 is mounted to the target surface 60 by bringing the eyewear 10 into close proximity with the magnet 30 to attract the ferromagnetic member, region, or surface 29 carried on the surface 27 of temple 17 of the eyewear 10 to magnet 30 resulting in magnetic engagement of the eyewear 10 to the magnet 30.

Figure 9:
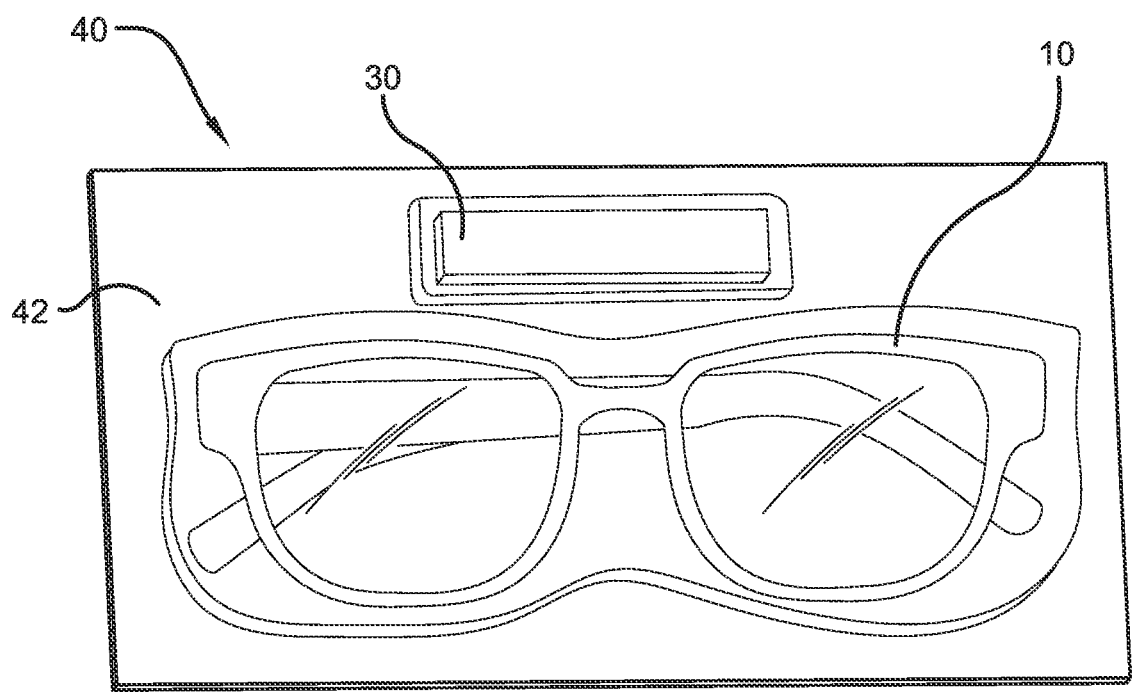
FIG. 9 is a top plan view showing the kit of the present disclosure comprising a pair of eyewear and a magnet.

FIG. 9 shows an illustrative embodiment of the kit of the present disclosure. Kit 50 includes at least one pair of eyewear 10, at least one magnet 30, and at least one strip of double-side adhesive foam tape 40 The at least one pair of eyewear 10, at least one magnet 30 and at least one strip of double-sided adhesive foam tape 40 is sealed within packaging 52.

The method of storing eyewear comprises attaching a magnet to a target surface, providing a pair of eyewear carrying a ferromagnetic member, region, or surface, region, or surface on at least one temple of the pair of eyewear, and magnetically engaging the pair of eyewear with the magnet attached to the target surface. This results in releasing mounting the pair of eyewear on the target surface.

According to certain illustrative embodiments, the method of storing eyewear comprises attaching a magnet to a target surface, providing eyewear comprising at least one pair of eyewear comprising first and second temples and a ferromagnetic member, region, or surface on at least one of said first or second temples, and engaging said ferromagnetic surface of said eyewear with said magnet.

According to certain illustrative embodiments, the method of storing eyewear comprises attaching a magnet to a target surface, providing at least one pair of eyewear comprises providing a pair of eyewear comprising a frame, at least one lens carried by said frame, first and second temples hingedly attached to said frame, and a ferromagnetic member, region, or surface on at least one of said first or second temples, and engaging said ferromagnetic surface of said eyewear with said magnet.

Without limitation, and only by way of illustration, the target surface to which the eyewear is magnetically mounted may be selected from a home surface, a commercial surface, an equipment surface, a building surface, an industrial surface, an office surface, a kitchen appliance surface, a cabinet surface, a car surface, a desk surface, a furniture surface, a toolbox surface, and a wall surface.

The method step of adhering, attaching, bonding, or otherwise mounting the magnet to the target surface comprises adhesively adhering, attaching, bonding, or otherwise mounting the magnet to the target surface with an adhesive. The adhesive used to adhesively adhere, attach, bond, or mount the magnet to the target surface may be selected from liquid adhesives, paste adhesives, and adhesive tapes and double-sided adhesive tapes.

According to certain embodiments, the magnet is attached, bonded or otherwise mounted onto the target surface with an adhesive tape. According to certain illustrative embodiments, the magnet is adhered, attached, bonded or otherwise mounted onto the target surface with an adhesive tape carrying a pressure sensitive adhesive. According to certain embodiments, the magnet is adhered, attached, bonded or otherwise mounted onto the target surface with a double-sided adhesive tape. According to certain illustrative embodiments, the magnet is adhered, attached, bonded or otherwise mounted onto the target surface with a double-sided adhesive tape carrying a pressure sensitive adhesive. The magnet may be adhered, attached, bonded, or otherwise mounted onto the target surface with a double-sided film tape or double-sided foam tape. The magnet may be adhered, attached, bonded, or otherwise mounted onto the target surface with a double-sided foam tape. The magnet may be adhered, attached, bonded, or otherwise mounted onto the target surface with a double-sided foam tape carrying a pressure sensitive adhesive on both sides of the double-sided foam tape. The double-sided foam tape comprises foam layer having opposite facing major surfaces that are coated with a layer of pressure sensitive adhesive. The double-sided foam tape further includes protective covering layers, such as a protective sheet layer, that can be removed from the foam tape prior to adhering it to a target surface. The pressure sensitive adhesive layers are coated with a suitable release layer to enable the covering layers to be easily removed without damaging the underlying pressure sensitive adhesive layers. Without limitation, suitable double-sided foam tapes are commercially available from 3M Company (Minneapolis, MN, USA).

The method of mounting a pair of may be carried out by removing a first covering layer from a first side the double-sided adhesive foam tape to expose the pressure sensitive adhesive layer carrier by the first side of the foam layer of the double-sided foam tape and adhering it to a desired target surface by and applying a sufficient amount of pressure to adhere the double-sided foam tape to the target surface. The second protective covering layer is removed from the second side of the foam layer of the double-sided foam tape to expose a second pressure sensitive adhesive coating layer carried by the second side of the foam layer of the double-sided foam tape. The magnet has opposite facing first and second major surfaces. The magnet is adhesively bonded to the second surface of the double-sided adhesive foam by contacting the first major surface of the magnet with the exposed pressure sensitive adhesive carried by the second side of the foam layer of the double-sided foam tape and applying a sufficient amount of pressure to adhere the magnet to the double-sided foam tape. The eyewear having the ferromagnetic member, region, or surface is brought into proximity with the mounted magnet and the magnetic field generated by the magnet pulls the eyewear to the magnet to mount the eyewear to the magnet.

While illustrative embodiments of the disclosure have been described herein, it is to be understood that other embodiments may be used or modifications and additions may be made to the described embodiments for performing the same function of the present embodiments without deviating therefrom. Further, all embodiments disclosed are not necessarily in the alternative, as various embodiments of the invention may be combined to provide the desired characteristics. Variations can be made by one having ordinary skill in the art without departing from the spirit and scope of the disclosure. Therefore, the present embodiments should not be limited to any single embodiment, but rather construed in breadth and scope in accordance with the recitation of the attached claims.

The invention claimed is:

1. Eyewear comprising a frame, first and second temples, and a ferromagnetic member, region, or surface on at least one of said first or second temples, wherein said ferromagnetic material is selected from ferromagnetic metals and ferromagnetic metal alloys, wherein said first and second temples comprises a plastic material, wherein the edge surface of the ferromagnetic material is surrounded by the plastic material of the first or second temples, and wherein the eyewear does not carry or include a magnet.

2. The eyewear of claim 1, comprising a frame, at least one lens carried by said frame, said first and said second temples hingedly attached to said frame; and said ferromagnetic member, region, or surface on at least one of said first or second temples.

3. The eyewear of claim 1, wherein said ferromagnetic metals are selected from the group consisting of cobalt, iron, nickel, cobalt alloys, iron alloys, nickel alloys and alloys of rare-earth metals.

4. The eyewear of claim 2, wherein said at least one of said first and said second temples comprises at least one recess, and wherein said ferromagnetic member, region, or surface comprises an inlay positioned within said at least one recess.

5. The eyewear of claim 4, wherein each of said first and said second temples comprise at least one recess, and wherein said ferromagnetic member, region, or surface comprises an inlay positioned within said at least one recess of each of said first and said second temples.

6. The eyewear of claim of claim 1, wherein said ferromagnetic material is inlaid into a recess formed in the outwardly facing surface of one or more of the first and second temples.

7. The eyewear of claim of claim 6, wherein said ferromagnetic material is inlaid into a recess formed in the outwardly facing surface of one or more of the first and second temples and wherein the outwardly facing surface of the ferromagnetic material and the outwardly facing surface of the one or more of the first and second temples are flush.

8. A kit comprising eyewear comprising (a) at least one pair of eyewear comprising a frame, first and second temples, and a ferromagnetic member, region, or surface on at least one of said first or second temples; and (b) at least one magnet, wherein said ferromagnetic material is selected from ferromagnetic metals and ferromagnetic metal alloys, wherein said frame and said first and second temples comprises a plastic material, wherein the edge surface of the ferromagnetic material is surrounded by the plastic material of the first or second temples, and wherein the eyewear does not carry or include a magnet.

9. The kit of claim 8, wherein said at least one pair of eyewear comprises a frame, at least one lens carried by said frame, said first and said second temples hingedly attached to said frame, and said ferromagnetic member, region, or surface on at least one of said first or second temples.

10. The kit of claim 8, wherein said ferromagnetic metals are selected from the group consisting of cobalt, iron and nickel.

11. The kit of claim 8, wherein said ferromagnetic metal alloys are selected from the consisting of cobalt alloys, iron alloys, nickel alloys and alloys of rare-earth metals.

12. The kit of claim 9, wherein said at least one of said first and said second temples comprise at least one recess, and wherein said ferromagnetic member, region, or surface comprises an inlay positioned within said at least one recess.

13. The kit of claim 12, wherein each of said first and said second temples comprise at least one recess, and wherein said ferromagnetic member, region, or surface comprises an inlay positioned within said at least one recess of each of said first and said second temples.

14. The kit of claim 8, wherein said at least one magnet is selected a material capable of producing a magnetic field and exerting pulling force on a ferromagnetic material.

15. The kit of claim 14, wherein said magnet comprises a neodymium magnet.

16. The kit of claim 8, further comprising an adhesive for adhesively bonding said magnet to a surface.

17. The kit of claim 16, wherein said adhesive is selected from the group consisting of liquid adhesives, paste adhesives, and double-sided adhesive tapes.

18. The kit of claim 17, wherein said adhesive tape is selected from double-sided film tapes and double-sided foam tapes.

19. The kit of claim 18, wherein said adhesive tape comprises a double-sided foam tapes.

20. The kit of claim 19, further comprising instructions for mounting said eyewear with said magnet.

21. A method of storing eyewear comprising:
(a) attaching a magnet to a target surface;
(b) providing eyewear comprising at least one pair of eyewear comprising a frame, first and second temples, and a ferromagnetic member, region, or surface on at least one of said first or second temples, wherein said ferromagnetic material is selected from ferromagnetic metals and ferromagnetic metal alloys, wherein said frame and said first and second temples comprises a plastic material, wherein the edge surface of the ferromagnetic material is surrounded by the plastic material of the first or second temples, and wherein the eyewear does not carry or include a magnet; and
(c) engaging said ferromagnetic surface of said eyewear with said magnet.

22. The method of claim 21, wherein the step of providing at least one pair of eyewear comprises providing a pair of eyewear comprising a frame, at least one lens carried by said frame, first and second temples hingedly attached to said frame, and a ferromagnetic member, region, or surface on at least one of said first or second temples.

23. The method of claim 22, wherein attaching said magnet to said target surface comprises adhesively attaching the magnet to said target surface with an adhesive.

24. The method of claim 23, wherein adhesively attaching said magnet to said target surface with an adhesive comprises adhesively attaching said magnet with an adhesive is selected from the group consisting of liquid adhesives, paste adhesives, and double-sided adhesive tapes.

25. The method of claim 24, wherein adhesively attaching said magnet to said target surface with a double-sided adhesive tape comprises adhesively attaching said magnet with a double-sided foam tape.

26. The method of claim 25, wherein the target surface is selected from the group consisting of a kitchen appliance surface, a cabinet surface, a car surface, a desk surface, a furniture surface, a toolbox surface, and a wall surface.

* * * * *